(12) United States Patent
Medlock et al.

(10) Patent No.: US 9,052,748 B2
(45) Date of Patent: Jun. 9, 2015

(54) SYSTEM AND METHOD FOR INPUTTING TEXT INTO ELECTRONIC DEVICES

(75) Inventors: Benjamin Medlock, London (GB); Jonathan Reynolds, London (GB)

(73) Assignee: TOUCHTYPE LIMITED, London (GB)

( * ) Notice: Subject to any disclaimer, the term of this patent is extended or adjusted under 35 U.S.C. 154(b) by 251 days.

(21) Appl. No.: 13/582,402

(22) PCT Filed: Mar. 4, 2011

(86) PCT No.: PCT/GB2011/000309
§ 371 (c)(1),
(2), (4) Date: Oct. 26, 2012

(87) PCT Pub. No.: WO2011/107751
PCT Pub. Date: Sep. 9, 2011

(65) Prior Publication Data
US 2013/0041857 A1     Feb. 14, 2013

(30) Foreign Application Priority Data

Mar. 4, 2010   (GB) .................... 1003628.3

(51) Int. Cl.
*G06F 15/18*     (2006.01)
*G06F 3/023*     (2006.01)
*G06F 17/27*     (2006.01)

(52) U.S. Cl.
CPC ............ *G06F 3/0237* (2013.01); *G06F 17/276* (2013.01)

(58) Field of Classification Search
USPC ......................................................... 706/14
See application file for complete search history.

(56) References Cited

U.S. PATENT DOCUMENTS

| 5,477,451 | A | 12/1995 | Brown et al. |
| 5,612,690 | A | 3/1997 | Levy |
| 5,671,426 | A | 9/1997 | Armstrong, III |
| 5,680,511 | A | 10/1997 | Baker et al. |
| 5,768,603 | A | 6/1998 | Brown et al. |
| 5,805,832 | A | 9/1998 | Brown et al. |
| 6,009,444 | A | 12/1999 | Chen |
| 6,011,554 | A | 1/2000 | King et al. |

(Continued)

FOREIGN PATENT DOCUMENTS

| CN | 1707409 A | 12/2005 | |
| EP | 1 843 240 A1 * | 10/2007 | .............. G06F 3/023 |

(Continued)

OTHER PUBLICATIONS

Single-sided approach to discriminative PLDA training for text-independent speaker verification without using expanded i-vector Hirano, I. ; Kong Aik Lee ; Zhaofeng Zhang ; Longbiao Wang ; Kai, A. Chinese Spoken Language Processing (ISCSLP), 2014 9th Intl Symposium on DOI: 10.1109/ISCSLP.2014.6936581 Pub Year: 2014 , pp. 59-63.*

(Continued)

*Primary Examiner* — Michael B Holmes
(74) *Attorney, Agent, or Firm* — Baker & Hostetler LLP

(57) ABSTRACT

The present invention relates generally to a system and method for the reordering of text predictions. More particularly, the system and method reorders the text predictions based on modified probability values, wherein the probability values are modified according to the likelihood that a given text prediction will occur in the text inputted by a user.

20 Claims, 3 Drawing Sheets

(56) References Cited

U.S. PATENT DOCUMENTS

| | | | |
|---|---|---|---|
| 6,052,657 A | 4/2000 | Yamron et al. |
| 6,054,941 A | 4/2000 | Chen |
| 6,104,989 A | 8/2000 | Kanevsky et al. |
| 6,125,342 A | 9/2000 | Selesky |
| 6,182,027 B1 | 1/2001 | Nasukawa et al. |
| 6,204,848 B1 | 3/2001 | Nowlan et al. |
| 6,219,632 B1 | 4/2001 | Schumacher et al. |
| 6,236,958 B1 | 5/2001 | Lange et al. |
| 6,253,169 B1 | 6/2001 | Apte et al. |
| 6,275,792 B1 | 8/2001 | Lewis |
| 6,286,064 B1 | 9/2001 | King et al. |
| 6,307,548 B1 | 10/2001 | Flinchem et al. |
| 6,307,549 B1 | 10/2001 | King et al. |
| 6,321,192 B1 | 11/2001 | Houchin et al. |
| 6,327,561 B1 | 12/2001 | Smith et al. |
| 6,362,752 B1 | 3/2002 | Guo et al. |
| 6,393,399 B1 | 5/2002 | Even |
| 6,460,015 B1 | 10/2002 | Hetherington et al. |
| 6,484,136 B1 | 11/2002 | Kanevsky et al. |
| 6,490,549 B1 | 12/2002 | Ulicny et al. |
| 6,519,557 B1 | 2/2003 | Emens et al. |
| 6,625,600 B2 | 9/2003 | Lyudovyk et al. |
| 6,671,670 B2 | 12/2003 | Levin et al. |
| 6,724,936 B1 | 4/2004 | Riemer |
| 6,813,616 B2 | 11/2004 | Simpson et al. |
| 6,911,608 B2 | 6/2005 | Levy |
| 6,925,433 B2 | 8/2005 | Stensmo |
| 6,963,831 B1 | 11/2005 | Epstein |
| 6,965,856 B1 | 11/2005 | Stuermer |
| 6,993,476 B1 | 1/2006 | Dutta et al. |
| 7,075,520 B2 | 7/2006 | Williams |
| 7,092,870 B1 | 8/2006 | Chen et al. |
| 7,098,896 B2 | 8/2006 | Kushler et al. |
| 7,175,438 B2 | 2/2007 | Levy |
| 7,187,365 B2 | 3/2007 | Harman |
| 7,222,067 B2 | 5/2007 | Glushnev et al. |
| 7,251,367 B2 | 7/2007 | Zhai |
| 7,269,546 B2 | 9/2007 | Stensmo |
| 7,366,666 B2 | 4/2008 | Balchandran et al. |
| 7,426,505 B2 | 9/2008 | Simpson et al. |
| 7,453,439 B1 | 11/2008 | Kushler et al. |
| 7,475,010 B2 | 1/2009 | Chao |
| 7,487,461 B2 | 2/2009 | Zhai et al. |
| 7,562,016 B2 | 7/2009 | Balchandran et al. |
| 7,580,829 B2 | 8/2009 | James et al. |
| 7,610,189 B2 | 10/2009 | Mackie |
| 7,610,191 B2 | 10/2009 | Gao et al. |
| 7,706,616 B2 | 4/2010 | Kristensson et al. |
| 7,750,891 B2 | 7/2010 | Stephanick et al. |
| 7,809,575 B2 | 10/2010 | Ativanichayaphong et al. |
| 7,814,088 B2 | 10/2010 | Simpson et al. |
| 7,920,132 B2 | 4/2011 | Longe et al. |
| 7,996,211 B2 | 8/2011 | Gao et al. |
| 8,010,343 B2 | 8/2011 | Agapi et al. |
| 8,032,358 B2 | 10/2011 | Helletzgruber et al. |
| 8,073,698 B2 | 12/2011 | Ativanichayaphong et al. |
| 8,074,172 B2 | 12/2011 | Kocienda et al. |
| 8,117,144 B2 | 2/2012 | Angell et al. |
| 8,136,050 B2 | 3/2012 | Sacher et al. |
| 8,200,487 B2 | 6/2012 | Peters et al. |
| 8,225,203 B2 | 7/2012 | Unruh |
| 2002/0196163 A1 | 12/2002 | Bradford et al. |
| 2004/0083198 A1 | 4/2004 | Bradford et al. |
| 2006/0167872 A1 | 7/2006 | Parikh |
| 2006/0274051 A1 | 12/2006 | Longe et al. |
| 2007/0094024 A1 | 4/2007 | Kristensson et al. |
| 2008/0189605 A1 | 8/2008 | Kay et al. |
| 2008/0195374 A1 | 8/2008 | Holubar et al. |
| 2008/0195388 A1 | 8/2008 | Bower et al. |
| 2008/0285857 A1 | 11/2008 | Sharan et al. |
| 2009/0284471 A1 | 11/2009 | Longe et al. |
| 2010/0017393 A1 | 1/2010 | Broicher et al. |
| 2010/0121870 A1 | 5/2010 | Unruh et al. |
| 2010/0171700 A1 | 7/2010 | Sharan et al. |
| 2011/0047456 A1 | 2/2011 | Sharan et al. |
| 2011/0179032 A1 | 7/2011 | Ceusters et al. |
| 2012/0010875 A1 | 1/2012 | Helletzgruber et al. |
| 2012/0167009 A1 | 6/2012 | Davidson et al. |
| 2012/0197825 A1 | 8/2012 | Medlock et al. |
| 2013/0041857 A1* | 2/2013 | Medlock et al. ............... 706/14 |
| 2013/0253912 A1* | 9/2013 | Medlock et al. ............... 704/9 |
| 2014/0108994 A1* | 4/2014 | Medlock et al. ............. 715/773 |
| 2014/0359515 A1* | 12/2014 | Medlock et al. ............. 715/773 |

FOREIGN PATENT DOCUMENTS

| | | |
|---|---|---|
| EP | 1843240 | 10/2007 |
| WO | WO 2005/045695 | 5/2005 |
| WO | WO 2010/112841 | 10/2010 |
| WO | WO 2011/042710 | 4/2011 |

OTHER PUBLICATIONS

Integrated automatic expression prediction and speech synthesis from text, Langzhou Chen ; Gales, M.J.F. ; Braunschweiler, N. ; Akamine, M. ; Knill, K. Acoustics, Speech and Signal Processing (ICASSP), 2013 IEEE International Conference on DOI: 10.1109/ICASSP.2013.6639218 Publication Year: 2013 , pp. 7977-7981.*

Output-based objective speech quality using vector quantization techniques, Chiyi Jin ; Kubichek, R. Signals, Systems and Computers, 1995. 1995 Conference Record of the Twenty-Ninth Asilomar Conference on vol. 2 DOI: 10.1109/ACSSC.1995.540907 Publication Year: 1995 , pp. 1291-1294 vol. 2.*

Vector quantization techniques for output-based objective speech quality, Chiyi Jin ; Kubichek, R. Acoustics, Speech, and Signal Processing, 1996. ICASSP-96. Conference Proceedings., 1996 IEEE International Conference on vol. 1 DOI: 10.1109/ICASSP.1996.541140 Publication Year: 1996 , pp. 491-494 vol. 1.*

* cited by examiner

SYSTEM AND METHOD FOR INPUTTING TEXT INTO ELECTRONIC DEVICES

CROSS-REFERENCE TO RELATED APPLICATIONS

This application is the National Stage of International Application No. PCT/GB2011/000309, filed 4 Mar. 2011, which claims the benefit of British Patent Application No. 1003628.3, filed 4 Mar. 2010, the disclosure of which is incorporated herein by reference in its entirety.

The present invention relates generally to a system and method for inputting text into electronic devices. In particular the invention relates to a system and method for the adaptive reordering of text predictions for display and user selection. Text predictions are reordered to place predictions that are more likely to be relevant to the current textual context at the top of a list for display and user selection, thereby facilitating user text input.

There currently exists a wide range of text input techniques for use with electronic devices, for example, QWERTY-style keyboards for text input into a computer or laptop, handwriting recognition in the PDA market, alphabetic character entry using a 9-digit keypad for mobile phone devices, speech recognition text input systems for both standard and mobile computational devices, and touch-screen devices.

In the case of mobile phone technology there are a number of existing text input technologies. Notable examples include Tegic Communications' 'T9', Motorola's 'iTap', Nuance's 'XT9', 'eZiType' and 'eZiText', Blackberry's 'SureType', KeyPoint Technology's 'AdapTxt' and CooTek's 'TouchPal'. These techniques comprise predominantly character-based text input and utilise some form of text prediction (or disambiguation) technology. In each of the identified models, a dictionary (or plurality of dictionaries) of allowable terms is maintained and, given a particular input sequence, the system chooses a legitimate term (or set of terms) from the dictionary and presents it to the user as a potential completion candidate. The basic dictionary can be augmented with new terms entered by the user, limited by the amount of device memory available.

In these systems, completions are ordered on the basis of usage frequency statistics and in some cases (e.g. eZiText, AdapTxt, TouchPal) using immediate lexical context.

The present invention represents a significant enhancement over systems in which text predictions are ordered solely on the basis of recency or frequency. It allows the ordering of predictions to be influenced by the likelihood that the predicted term or phrase belongs in the current contextual context, i.e. in the current text sequence entered by a user. The system according to the present invention allows 'nonlocal' context to be taken into account.

The present invention therefore provides for a more accurate ordering, by a system, of text predictions generated by the system, thereby reducing the user labour element of text input (because the user is less likely to have to scroll through a list of predicted terms, or enter additional characters, to find their intended term).

In accordance with the present invention there is provided a system and method which utilises a vector space technique, Random Indexing, to estimate the likelihood that a given term or phrase belongs within the current textual context. The system therefore generates a modified probability value for a given predicted term/phrase, based on the likelihood that the term/phrase belongs within the current context. The system uses the modified probabilities to reorder and/or select the text predictions generated by a text prediction engine. The generated text predictions can then be displayed for user selection to input text into an electronic device.

Reordering the text predictions by the likelihood that they belong within the current context offers the advantage of placing predictions that are more likely to be relevant to the current textual context at the top of a list for display and user selection, thereby facilitating user text input. This is highly advantageous where space for presentation to a user of text predictions is limited to a subset of the predictions. The system of the present invention can therefore predict accurately, from the user inputted text, the predictions most likely to correspond to a user's intent.

The present invention will now be described in detail with reference to the accompanying drawings, in which.

Figure 1:
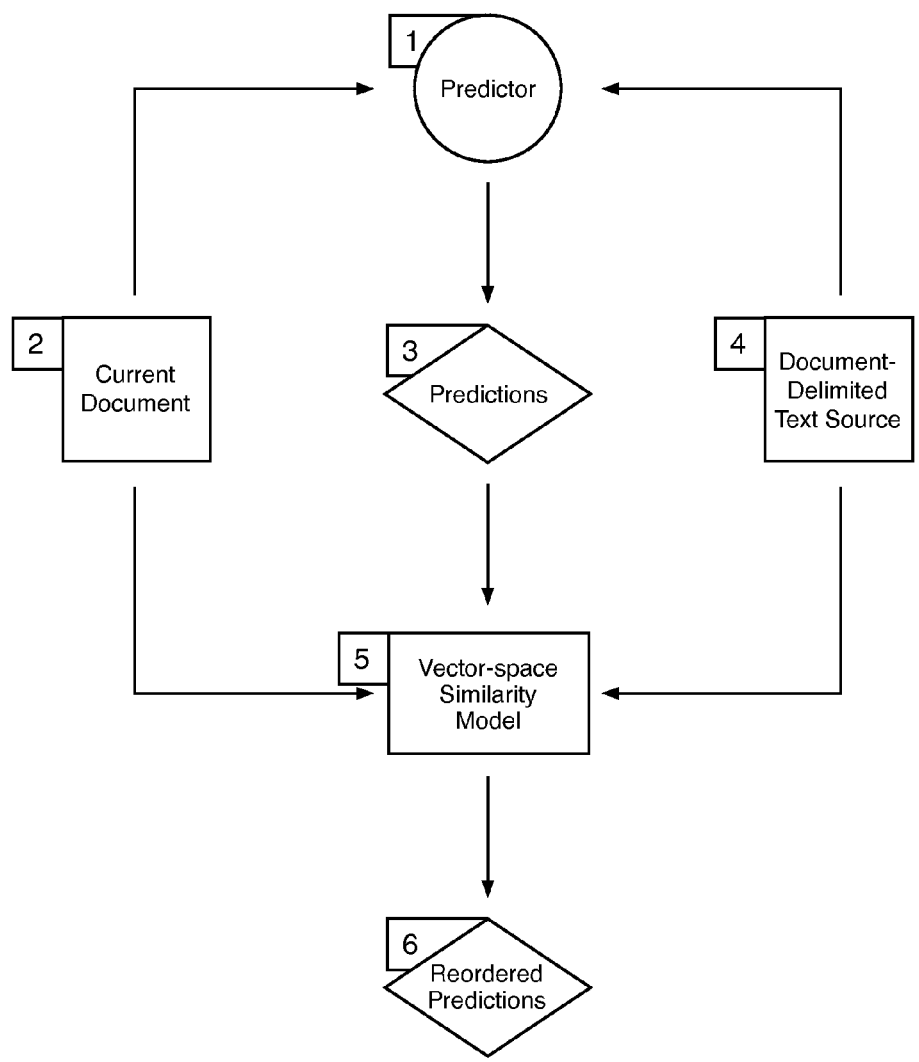
FIG. 1 is a schematic of a system architecture according to the invention.

The present invention provides a language model based text prediction system for the adaptive reordering of text prediction components. The system utilises a vector space technique, preferably Random Indexing, to modify probability values assigned to text predictions based on a likelihood that the text predictions belong within sections of text entered by a user.

Random Indexing is a vector space technique used to generate context vectors representing terms in the vector space. Each context (e.g. each document in this case) in a given section of data is assigned a unique and randomly-generated representation called an index vector. Random Indexing is an incremental method, which means that the context vectors can be used for similarity computations even after just a few examples have been encountered. In the present system, each document is assigned a unique index vector and each term has a context vector associated with it. Each context vector consists of the sum of index vectors for all documents in which that term occurs. Owing to the underlying Random Indexing model being incremental, the present system and method allows for real-time updating as new 'documents' are created by the user.

Although the preferred technique used to generate context vectors and to map terms in a set of documents into a vector space is Random Indexing, the present invention is not limited to the use of Random Indexing. By way of non-limiting example, for a vector space/distributional similarity model, one could use Latent Semantic Analysis, Probabilistic Semantic Analysis or Latent Dirichlet Allocation models.

In Random Indexing, terms are mapped into a vector space, where the distance between points in the space (as estimated by a distance metric, or an inverse similarity metric) is indicative somehow of the relationship between the terms represented by those points. The present system uses Random Indexing to provide an estimate of the likelihood that two arbitrary terms will occur within the same document, given a collection of pre-existing documents upon which the system is trained. A document comprises a distinct section of text that has clearly defined beginning and end points. By way of non-limiting example, the document could be an email message, a news story, a blog entry, an SMS message, a magazine article, or an academic paper. It can be expected that if two terms have occurred in exactly the same set of documents within a set of training data, they should be 'close' in the vector space. Conversely, if terms have occurred in disjoint sets of documents then they should be 'distant' in the vector space.

In the present invention, the system uses Random Indexing to map terms in a set of documents into a vector space. The system is configured to determine the closeness in vector space between a vector representing a predicted term and a vector representing the current text input into an electronic device by a user. The system generates a modified probability value corresponding to each predicted term based on the closeness of the two vectors in vector space. The present system therefore generates an estimate of the likelihood that a predicted term and a term that has been inputted into a device by a user will occur within the same section of user inputted text.

As stated above, the modified probabilities for the text prediction components are used by the system to reorder the text prediction components that have been generated by the system from user inputted text. The system is therefore capable of placing the most probable predictions (based on local context, non-local context and information about the current word, if there is one) at the top of a list of text predictions generated for display and user selection, thereby facilitating user selection and text input.

The present system can be employed in a broad range of electronic devices. By way of non-limiting example, the present system can be used for mobile phone text entry, for text input into a PDA device, or for computer text entry (for example, where a key stroke and means of scrolling can be used to select the relevant prediction or where the device employs touch screen technology).

The system of the present invention is shown schematically in FIG. 1. Elements of the system will now be described with reference to this figure.

The system includes, firstly, a predictor 1 which generates text (or similar) predictions. A predictor is a device which, given some text context (i.e. current document 2), generates a set of predictions 3. Each prediction 3 consists of a text string, i.e. a term or phrase (denoted by s_i), and a probability value, denoted by p_i. The set of predictions 3 is therefore of the form $\{(s\_1, p\_1), (s\_2, p\_2) \ldots (s\_n, p\_n)\}$, where there are n predictions in a set. As one skilled in the art will understand, any type of predictor and any number of predictors can be used to generate text predictions 3 in a text prediction system. Preferably, the predictor generates text predictions based on the context of the user inputted text, i.e. the predictor generates text predictions for the nth term, based on up to n−1 terms of context. Here, "context" denotes both the terms that have occurred previously in the sequence, as well as any knowledge the system has about the current term (e.g. it starts with a specific character or characters, or it is indicative of a certain topic). Given a particular context, the system predicts the words that are most likely to follow by using estimates of probabilities. The predictions can be generated by a multi-language model as well as a single language model predictor. A thorough description of the use of a predictor (single and multi-language model) to generate text predictions is presented in United Kingdom patent application number 0905457.8 and international publication number WO2010/112841, "System and method for inputting text into electronic devices", which are incorporated herein by reference in their entirety. Furthermore, a thorough description of the use of an adaptive predictor (single and multi-language model) to generate category-weighted text predictions is presented in United Kingdom patent application number 0917753.6 and international application number PCT/GB2010/001898, "System and method for inputting text into electronic devices", which are incorporated herein by reference in their entirety.

A current document 2 consists of a sequence of terms representing the current document, e.g. a partially completed email message, news story, etc. The current document 2 provides the text context which is fed into the predictor 1 to enable it to generate text predictions 3.

The predictions 3 can be word, phrase or punctuation predictions or the like which have been generated by the predictor 1. Preferably, the predictions are context based predictions. These predictions can be displayed to the user for user selection, to allow the user to progress or complete a sentence/document.

The system of the invention includes also a Document Delimited Text Source 4, which is a collection of textual data organised into 'documents'. The 'documents' are sections of text that are internally homogeneous with respect to some aspect of their content (e.g. an article on a particular topic, or an email sent to a particular person). The predictor 1 is trained using the textual data contained within the Document Delimited Text Source 4.

The system also includes a Vector-Space Similarity Model 5, which is a component of the system which is configured to adjust probabilities associated with term or phrase predictions output by the predictor 1 based on an estimate of the likelihood that a given prediction will occur in the current document. The result of this is a (potentially) reordered prediction set 6. The Vector-Space Similarity Model 5 takes as inputs the current document 2, the Document Delimited Text Source 4 and the predictions 3, and outputs a (potentially) reordered set of predictions 6.

According to the present invention, when a user inputs text into an electronic device, the inputted text (i.e. current document 2) is passed to at least one predictor 1 and a Vector-Space Similarity Model 5. The user inputted text is split into terms by a 'tokeniser' as is known in the art. The predictor 1 uses the tokenised user inputted text to generate term or phrase (or the like) predictions 3. The text predictions 3 are passed to the Vector Space Similarity model. The Vector space Similarity Model 5 uses tokenised information from the current document 2 and the Document Delimited Text Source 4 to reorder the text predictions 3, by modifying the probabilities associated with the generated text predictions 3, to generate a set of (potentially) reordered predictions 6, as will be described in more detail below.

Figure 2:
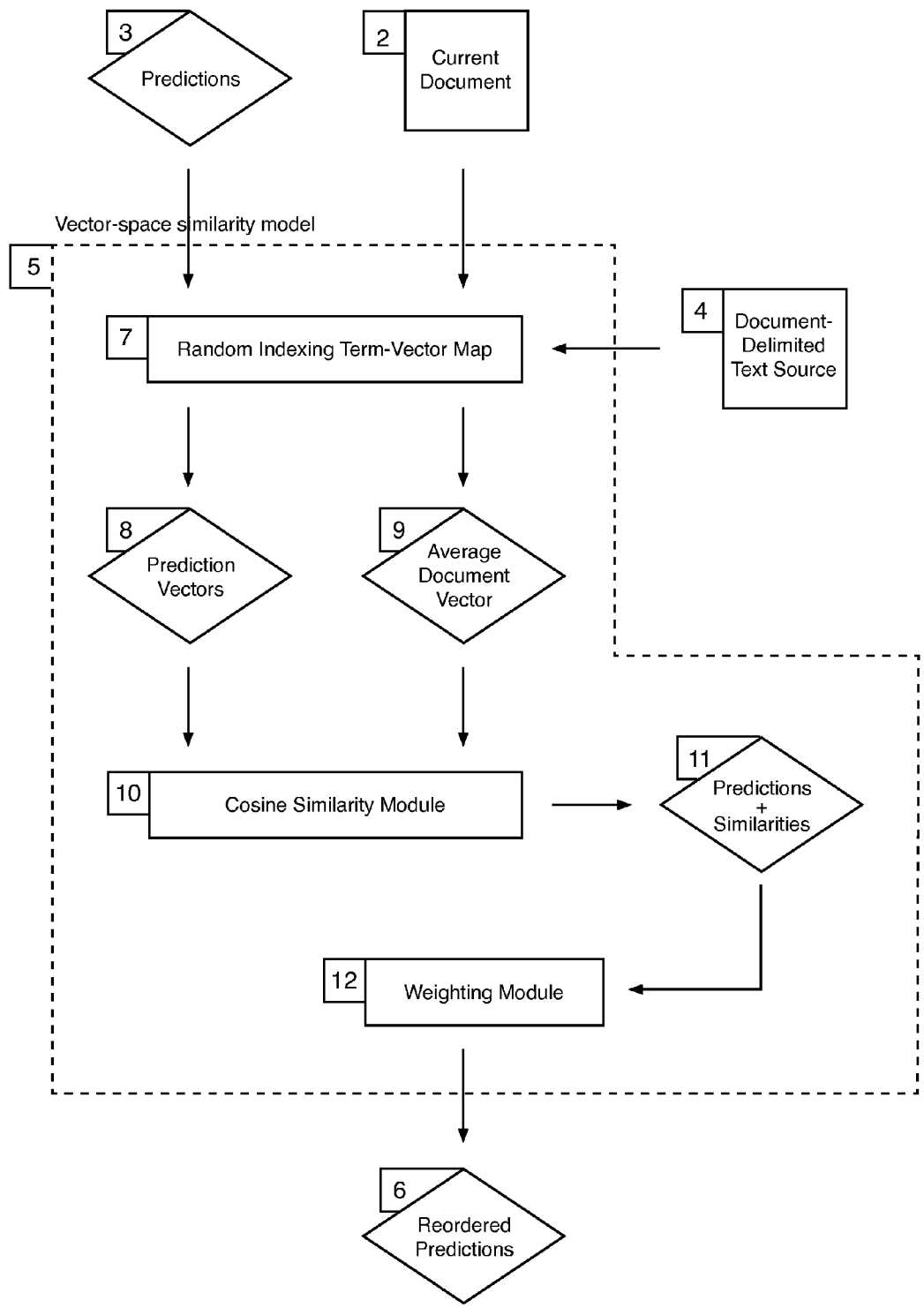
FIG. 2 is a schematic of the same system architecture as shown in FIG. 1, in which a Vector-Space Similarity Model is shown in greater detail.

FIG. 2 provides a more detailed representation of the Vector-Space Similarity Model 5 which is used to modify the probabilities associated with generated prediction terms according to the likelihood that each of the predicted terms will occur within the current document (given the terms that have currently been entered) and to reorder the prediction terms accordingly.

The Vector-Space Similarity Model 5 comprises a Random Indexing Term-Vector Map 7, a Cosine Similarity Module 10 and a Weighting Module 12.

The Random Indexing Term-Vector Map 7 is constructed by assigning a dimensionality, D, for the target vector space. Any dimensionality can be assigned, but D is typically around 1,000-3,000. The Random Indexing Term-Vector Map 7 is configured to generate a D-dimensional index vector for each document in the training data, i.e. each document in the Document Delimited Text Source 4. The Random Indexing Term-Vector Map 7 assigns a context vector consisting of the sum of index vectors for all documents in which that term occurs. Index vectors are sparse, random projections into the vector space and are generated by the Random Indexing Term-Vector Map 7 by assigning a small number (<<D) of ±1s randomly across the dimensional range and assigning all other dimensions a value of zero. For example, given a target number of non-zero terms, n<<D, the Random Indexing Term-Vector Map 7 may generate random events by iterating over all vector cells, where the total number of vector cells is equal to the dimensionality D. For any given vector cell, the Random Indexing Term-Vector Map 7 randomly assigns a value of 0, +1 or −1 to the cell according to the following probabilities:

with a probability~n/2D, the Random Indexing Term-Vector Map assigns a value of +1;

with a probability~n/2D, the Random Indexing Term-Vector Map assigns a value of −1;

with a probability~(D−n)/D, the Random Indexing Term-Vector Map assigns a value of 0.

Some terms may be filtered out of the Random Indexing Term-Vector Map 7 as they are judged as adding 'noise' rather than useful information. The set of filtered terms is dependent on the domain/application, but as an example, the term 'the' will often have occurred in most, if not all documents in an English language-based domain, and is therefore of little use in deciding whether a predicted term is likely to occur within the current document. One approach is to filter out terms that have very high occurrence rates across the whole training data collection (i.e. Document Delimited Text Source) 4. The filtering threshold will depend on the language, the quantity of training data, etc. By way of non-limiting example, for the English language, terms occurring with a probability greater than 0.01 might be filtered out. Another example is to remove 'stopwords', e.g. terms whose primary purpose is to provide syntactic structure but that hold low semantic significance. Examples of some stopwords which may be filtered out are as follows: a, an, the, these, this, those, then, of, in, at, about, by. This list is not limiting of course, and other stopwords may equally be filtered out.

As each new document is completed, it is assigned a new index vector by the Random Indexing Term-Vector Map 7 which is then added to the context vectors for all terms contained in that document. The context vector for each term consists of the sum of index vectors for all documents in which that term occurs. Therefore, when a new document is completed, the sum of index vectors for each term in that document comprises further the new index vector corresponding to that document. In this way, the Random Indexing Term-Vector Map 7 is constantly updated as new data is acquired.

The Random Indexing Term-Vector Map 7 is configured such that when it is presented with a particular term it returns the vector associated with that term. In implementation, the Random Indexing Term-Vector Map 7 contains a data structure that associates terms with real-valued vectors, i.e. vectors that reside in multi-dimensional real-number space.

A set of context vectors, one for each prediction 3, is retrieved from the Random Indexing Term-Vector Map 7 to generate Prediction Vectors 8. If the prediction is a phrase rather than a term, the Prediction Vector 8 associated with that prediction is generated as the arithmetic average of the context vectors for each term within the phrase. Some of the predicted terms might not exist in the Random Indexing Term-Vector Map 7, because they may have been filtered out to filter out 'noise'. In such cases, the probability value is not adapted by the Vector-Space Similarity Model 5.

The Random Indexing Term-Vector Map 7 is also used to generate an Average Document Vector 9. A set of context vectors, one for each term in the current document (i.e. the user inputted text) 2, is retrieved from the Random Indexing Term-Vector Map 7. The Average Document Vector 9 is generated by computing the arithmetic average of the context vectors for the terms of the current document 2. Preferably, the arithmetic average is the mean value. As already mentioned, there is the possibility that some of the terms from the current document will not be found in the Random Indexing Term-Vector Map 7, because those terms were filtered out for example. Therefore, the Average Document Vector 9 is the arithmetic average of the context vectors of the intersection of terms that occur in both the current document 2 and the Random Indexing Term-Vector Map 7.

The Vector-Space Similarity Model 7 also comprises a Cosine Similarity Module as already mention. This is configured to determine cosine similarity between the Average Document Vector 9 and each of the Prediction Vectors 8, both produced by the Random Indexing Term-Vector Map 7. Cosine similarity values range between −1 (least similar) and +1 (most similar). The resulting similarity values are mapped to their respective predictions to provide a set of predictions with corresponding similarities 11, which are passed to a Weighting Module 12.

Although cosine similarity metrics are preferred, alternative vector similarity metrics such as Euclidean distance and dot product could be used. There are also alternative similarity metrics, such as Jacquard index and Dice's coefficient which may be employed. Cosine similarity metrics are, however, preferred because they are normalised for length and operate on vectors.

The Weighting Module 12 is configured to modify the probabilities associated with each prediction 3 on the basis of the similarity values 11. The Weighting Module 12 is configured to weight prediction probabilities based upon cosine similarity and probability value to generate a modified probability value. The weighting module puts into effect a weighting function of the form w(p, s)=p' where p and p' are probabilities and s is a cosine similarity value. It can be formulated in a variety of different ways, three of which are given by way of non-limiting examples:

Perhaps the simplest formulation is provided by:

$$w(p,s)=\max(s,k) \cdot p \quad (1)$$

where 0≤k≤1. The cosine similarity values range between −1 and +1. The parameter k limits this range to between k and +1. The constant k therefore represents a lower bound on the effect the cosine similarity s can have on the prediction probability p. By restricting the range of cosine values in this way, the resulting modified probability values are prevented from falling below 0. Furthermore, this restriction controls the extent to which the similarity values affect the probability values. If k=1, the similarity values will have no affect on the probability values, for example.

Advantageously, this formulation is very simple to compute, which is beneficial in situations where processing resources are highly constrained. However, it is non-normalising and always results in a decrease in the overall probability mass assigned to the predictions, except in the unlikely instances where k=1 or where s=1 for all similarity values, in which cases the overall probability mass remains unchanged.

It is advantageous to use a normalising formulation because the modified probability values output by the present system may be compared to those output by other systems, either in a hierarchal system comprising multiple predictors or as generated by a system other than that described in the present invention. The comparison would be jeopardised if the scale of the estimates is significantly modified.

An alternative formulation maintains the overall probability mass associated with the predictions, but redistributes it in proportion to a similarity-scaled version of the original probabilities:

$$w(p, s) = \left[ \frac{\max(s, k) \cdot p}{\sum [\max(s, k) \cdot p]} \right] \cdot \sum p$$

where $0 \leq k \leq 1$.

The summation is over the set of predictions and the intuitive interpretation of this formulation is that the similarity values do not provide independent evidence for the likelihood that a given term or phrase should be predicted, rather that they are used to scale the existing probabilities. Consequently, if the similarity values are equal, the probabilities remain unchanged.

A third formulation maintains the overall probability mass associated with the predictions, but redistributes it in proportion to a weighted average between the probabilities and similarity values:

$$w(p, s) = \left[ \lambda \frac{\max(s, 0)}{S} + (1 - \lambda) \frac{p}{P} \right] \cdot P \quad (3)$$

where $0 \leq \lambda \leq 1$
$S = \Sigma \max(s, 0)$
$P = \Sigma p$

In this formulation, the evidence from the similarity values and the prediction probabilities are considered independently, with weight assigned to each according to the $\lambda$ parameter. The $\lambda$ parameter adjusts the weight between the contribution from the similarity values and from the probability values. If the value of $\lambda$ is set at 0.5, this represents a decision to weight the two different types of value equally. If the value is set at 0, there will be no contribution from the similarities and consequently no change to the original probabilities. Conversely, if the value is set at 1, the final probabilities will be governed entirely on the basis of the similarities and the original probabilities will be disregarded. max(s, 0) ensures that the resulting values are $\geq 0$. This approach is highly suitable in situations where it is important to be able to explicitly control the contributions from the probability and similarity values.

Where resources are not too tightly constrained, the choice of formulation should be made on an experimental examination of the resulting prediction accuracy.

For densely populated vector spaces, cosine similarity values can tend towards the upper bound, occupying a rather small band close to 1. In such cases it may be necessary to map the similarity values into a wider range. A simple linear function would be used to carry out this mapping.

The output from the Weighting Module 12 is a set of (potentially) reordered predictions 6. Preferably, the Weighting Module is configured to insert the modified probability values for the text predictions into an ordered associative structure (as known in the art), the structure comprising text predictions mapped to modified probability values, and to return the p most probable text predictions to generate the reordered text predictions 6.

By way of example, given the modified predictions "a"→0.2, "the"→0.3, "an"→0.1 and "these"→0.2, the weighting module inserts these weighted predictions into an ordered associative structure resulting in the following ordering of elements: ((0.1→"an"), (0.2→"a"), (0.2→"these"), (0.3→"the")). This structure can then be read in reverse to obtain the final set of 'most probable' predictions.

A predicted term which is selected by a user from the reordered list 6 can be entered into the system. The entered word then becomes a term in the current document 2. The entered term is part of the information passed to the predictor 1 to generate new text predictions 3. Furthermore, the entered term is used (along with the previous user text input) to generate the next Average Document Vector 9 which is used to reorder a next set of predictions 3 and thus to generate a next reordered prediction set for user display and/or selection. Once the current document has been completed by the user (e.g. the user has completed and sent a text message or e-mail), this document is used to update the Document Delimited Text Source 4, which is used to train the predictor 1, and the Random Indexing Term-Vector Map 7, which is used to generate context vectors to reorder the text predictions. To add the completed document to the Random Indexing Term-Vector Map 7, it is assigned a new index vector which is then added to the context vectors for all terms contained in that document. In this way, the Random Indexing Term-Vector Map 7 is constantly updated as new data is acquired, and the system evolves (or adapts to a user) over time/use.

As mentioned earlier, the predictor 1 of the present system can consist of a predictor which comprises multiple predictors arranged in hierarchy (i.e. an 'adaptive predictor' used to generate category-weighted text predictions as presented in United Kingdom patent application number 0917753.6 or international patent application number PCT/GB2010/001898). Each of the multiple predictors can be trained by a text source which is specific to that predictor. Referring to FIG. 1, the Document Delimited Text Source 4 can be a master text source, comprising the multiple text sources used to train the corresponding multiple predictors.

The text source used to train the predictor 1 of the system need not be the Document Delimited Text Source 4. However, for optimal results, the Document Delimited Text Source 4 is used to train the predictor 1.

By way of a non-limiting example, if the user has inputted a document into the system, the document is added to the Document Delimited Text Source 4 and the Random Indexing Term Vector Map 7 is updated to include this document. However, this document is not necessarily used to train further the predictor 1, and does not necessarily need to be added to the text sources corresponding to the multiple predictors of the predictor 1 of FIG. 1. In this scenario, if a user were to start entering the same word sequence as that of the previously entered document, the predictions generated by the predictor 1 would be the same as those generated for the previously entered document (because the word sequence of the previously entered document has not been used to train the predictors). However, the final predictions generated by the system of the present invention are (potentially) reordered, because the Prediction Vectors 8 and Average Document Vector 9 generated by the Random Indexing Term Vector Map 7 will differ (from those generated for the previously entered text sequence of the document) due to the updating of the Random Indexing Vector Map 7 to include the document added to the Document Delimited Text Source 4.

Alternatively, the entered document can be added to one or more of the multiple text sources used to train multiple corresponding predictors. In this case, the new document could be added to all of the text sources used to train the predictors. Alternatively, a classification technique could be used to predict which of the text sources the new document actually belongs to, e.g. if the user is entering a message about football, and the classifier identifies the text as being about football with high confidence (the exact threshold constituting 'high confidence' will depend on the application in question), the new doc can be added to a text source about football within the multiple text sources. Obviously, in certain situations it will be appropriate to add the document to more than one text source, based on the results of the classification.

As the skilled person will realise, this implementation can be applied to a hierarchal system comprising multiple systems as described by the present invention. In this case, there will be multiple predictors and multiple Document Delimited Text Sources 4. The reordered predictions 6 generated by each system (as shown in FIG. 1), can be combined to provide a final reordered prediction set by inserting each of the reordered prediction sets 6 into an ordered associative structure and reading the p most probable values.

A document entered by the user can then be added to all or none of the Document Delimited Text Sources 4, or only the most relevant Document Delimited Text Source(s) 4. Again, to determine the most relevant Document Delimited Text Source(s) 4, the system could use a classifier to classify the document to a particular topic. The system could then add this document to one or more Document Delimited Text Sources, based on the results of the classification.

Adding the document to all or none of the multiple text sources or Document Delimited Text Sources 4 is a relatively safe option. However, ideally, the new document is not permanently added to a text source until it can be confirmed (i.e. by human verification) that it actually belongs in that text source. This confirmation step is most relevant to a system in which the Document Delimited Text Source 4 is used to train the predictor 1 of the system. In this situation, the new document is used to train further the predictor as well as to train the prediction reordering process. However, in the alternative situation, where the text source used to train the predictor is not the Document Delimited Text Source 4, the step of confirming whether the document has been correctly classified can be omitted. Adding the entered document to the most relevant text source(s) or Document Delimited Text Source(s) 4 is arguably the optimal option, however, it relies on a relatively accurate classifier.

Figure 3:
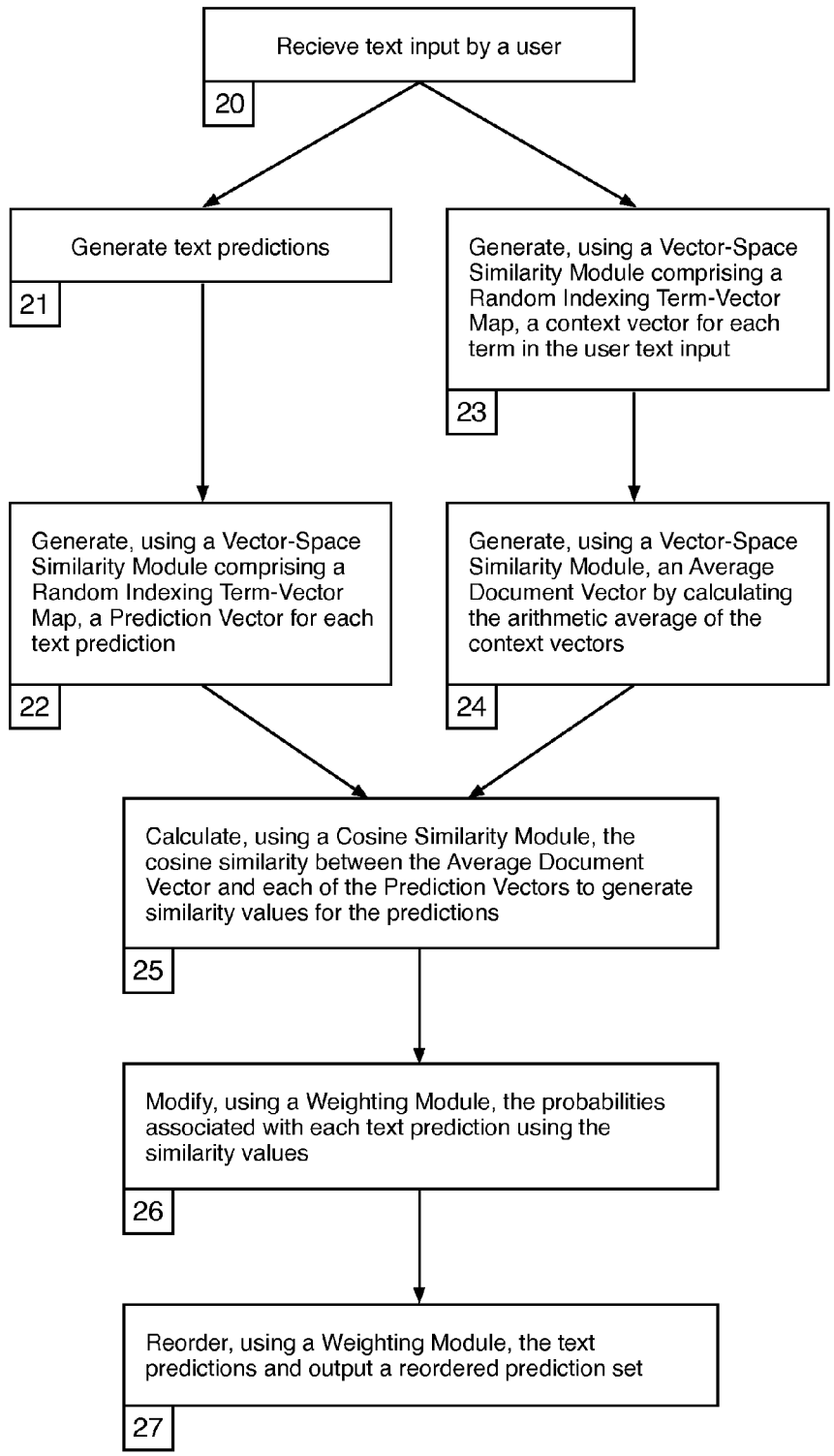
FIG. 3 is a schematic of a method according to the present invention.

A method according to the present invention is now described with reference to FIG. 3 which is a flow chart of a method for processing user text input and generating a reordered set of text predictions, wherein the reordering of predictions is based on the likelihood that the predicted term or phrase belongs in a user inputted text sequence. In the particular method described, the first step comprises receipt of user text input 20 in an electronic device. The user text input is used to generate 21, using one or more predictors, text predictions 3 from the user inputted text. The method further comprises generating 22, using a Vector Space Similarity Module 5 comprising a Random Indexing Term-Vector Map 7, a Prediction Vector 8 for each text prediction 3. The user text input is also used to generate 23, using the Vector Space Similarity Module 5 comprising the Random Indexing Term-Vector Map 7, a context vector for each term in the user inputted text 2. The method further comprises generating 24, using the Vector-Space Similarity Module 5, an Average Document Vector 9 by determining the arithmetic average of the context vectors. The method further comprises generating 25, using a Cosine Similarity Module 10, similarity values 11 for the predictions by determining the cosine similarity between the Average Document Vector 9 and each of the Prediction Vectors 8. The method further comprises Modifying 26, using a Weighting Module 12, the probabilities associated with each text prediction using the similarity values.

Finally, the method comprises reordering (if required) 27, using the Vector-Space Similarity Model 5, the text predictions 3 and outputting the reordered text predictions 6 for display to a user of an electronic device, and subsequent selection for entry into the electronic device.

The method for producing a set of re-ordered output text predictions is now described in greater detail with reference to FIG. 2 and a specific scenario. For the purpose of a non-limiting example, it will be assumed that the domain of the application is email, and that the Vector-space Similarity Model 5 has been trained on a set of email messages (Document Delimited Text Source) 4. The accuracy of the predicted terms 6 will improve as the number of training documents (i.e. the number of messages) increases.

In the example, the current user inputted text, i.e. the current document 2, consists of the following text sequence:

Dear Martha,

How lovely to hear about your work at the Kampala Children's Centre. I spent some time in and that the predictor 1 has generated the following prediction set 3:

(the, 0.1)
(Cambridge, 0.095)
(Switzerland, 0.08)
(my, 0.08)
(a, 0.075)
(Uganda, 0.06)
(China, 0.06)
(August, 0.05)
(Kampala, 0.04)
(their, 0.03)

In practice the predictor would be configured to generate a much larger prediction set. However, for the purpose of an example, the prediction set 3 will be limited to 10 text predictions.

The Random Indexing Term-Vector Map 7, which has been trained on the email message training set 4, is interrogated with each term from the prediction set 3 to generate a set of Prediction Vectors 8. Some of the terms from the prediction set 3 may not exist in the Random Indexing Term-Vector Map 7, because they will have been filtered out (as previously discussed). In this example, it is assumed that the following terms do exist: 'Cambridge', 'Switzerland', 'Uganda', 'China', 'August', 'Kampala' and that the others: 'the', 'my', 'a', 'their' have been filtered out. Thus, the prediction vector set 8 will contain six vectors. The Random Indexing Term-Vector Map 7 is also interrogated with each of the terms from the current document 2, i.e. each term in the sequence inputted by the user. Again, some of these terms will not exist within the Random Indexing Term-Vector Map 7. It will be assumed that the following terms do exist 'Dear', 'Martha', 'lovely', 'hear', 'work', 'Kampala', 'Children's', 'Centre', 'spent', 'time'. The arithmetic average of the vectors representing each of these terms is computed to yield a single average document vector 9, representing the current document 2.

A Cosine Similarity Module 12 takes in each of the six Prediction Vectors 8 in turn and generates their cosine similarity with the Average Document Vector 9. We will assume that the resulting prediction/similarity map 11 is as follows:
(Cambridge, 0.4)
(Switzerland, 0.2)
(Uganda, 0.75)
(China, 0.3)
(August, 0.4)
(Kampala, 0.85)

These values are then passed into the Weighting Module 12. Although the modified probability can be calculated in a variety of ways as already discussed, for this example it will be assumed that the weighting module 12 uses the following equation:

$$w(p, s) = \left[ \frac{\max(s, k) \cdot p}{\sum [\max(s, k) \cdot p]} \right] \cdot \sum p$$

where $0 \leq k \leq 1$

We will assume a value of 0 for k.

For the prediction 'Cambridge', the weighting module computes the value: w(0.095, 0.4), which in this case equals 0.086. The complete list of values is as follows:

Cambridge w(0.095, 0.4)=0.086
Switzerland w(0.08, 0.2)=0.036
Uganda w(0.06, 0.75)=0.101
China w(0.06, 0.3)=0.041
August w(0.05, 0.4)=0.045
Kampala w(0.04, 0.85)=0.077

The probabilities that did not have similarity values are left unchanged. The Weighting Module 12 inserts the probability values into an ordered, associative structure and returns the p most probable predictions (in this case p=10) to yield the following reordered prediction set 6:

(Uganda, 0.101)
(the, 0.1)
(Cambridge, 0.086)
(my, 0.08)
(Kampala, 0.077)
(a, 0.075)
(August, 0.045)
(China, 0.041)
(Switzerland, 0.036)
(their, 0.03)

The overall probability mass assigned to the complete set of predictions (0.67) remains unchanged. Furthermore, the probability mass assigned to the group of predicted terms which are found in the Random Indexing Term-Vector Map 7 remains unchanged.

In the case where many predictions 3 are generated, the p most probable predictions of the reordered prediction set 6, does not necessarily comprise the same p most probable terms generated from the user inputted text 3, i.e. the reordering of the prediction set can change which terms are present in the p most probable terms, as well as the order in which those terms occur.

Alternatively, if we assume that the weighting function is given by the following equation:

$$w(p, s) = \left[ \lambda \frac{\max(s, 0)}{S} + (1 - \lambda) \frac{p}{P} \right] \cdot P$$

where $0 \leq \lambda \leq 1$
$S = \Sigma \max(s, 0)$
$P = \Sigma p$ setting $\lambda=0.5$ (which represents an equal balance between the prediction probabilities and the similarity values) we arrive at the following values:

Cambridge w(0.095, 0.4)=0.074
Switzerland w(0.08, 0.2)=0.053
Uganda w(0.06, 0.75)=0.080
China w(0.06, 0.3)=0.050
August w(0.05, 0.4)=0.052
Kampala w(0.04, 0.85)=0.076

Consequently, the re-ordered prediction set is as follows:

(the, 0.1)
(Uganda, 0.08)
(my, 0.08)
(Kampala, 0.076)
(a, 0.075)
(Cambridge, 0.074)
(Switzerland, 0.053)
(August, 0.052)
(China, 0.050)
(their, 0.03)

Once again the total probability mass remains unchanged at 0.67.

The newly ordered list 6 can then be presented to the user for user selection. In the present method example, say the user intended to enter the term 'the' and thus selects this term for entry into the system. 'the' is passed to the predictor 1, along with the terms of the preceding text sequence, to generate new text predictions 3. Furthermore, 'the' is included in the current document terms used to generate the Average Document Vector 9 which is used to reorder the new predictions 3.

Once the email has been completed by the user, this email is added to the Document Delimiting Text Source 4, which is used to train further the predictor 1. Furthermore, the email is assigned a new index vector which is then added to the context vectors for all terms contained in that document to update the Indexing Term-Vector Map 7.

The system and method according to the present invention therefore provides an improved means of inputting text into electronic devices. The system and method provides a means for reordering text predictions generated by the system, based on a likelihood that the predicted term belongs in the section of text or text sequence which has been input by a user. The reordering of text predictions places the most likely prediction candidates at the top of a list which is presented to the user for user selection. This facilitates text entry for the user by reducing the labour involved in entering text, as it reduces/eliminates the requirement for the user to scroll through predicted terms to find the term they intend to enter. The present system and method therefore provides a more accurate means of generating text predictions.

It will be appreciated that this description is by way of example only; alterations and modifications may be made to the described embodiment without departing from the scope of the invention as defined in the claims. For example, as mentioned previously, there are a number of vector space/distributional similarity models than can be used to generate context vectors and map terms to a vector space. The system and method of the present invention is not therefore limited to the use of Random Indexing.

The invention claimed is:

1. A system comprising:
  a processor;
  memory storing instructions that, when executed by the processor, configure the processor to:
    receive a text input;
    generate, using the text input, one or more text predictions, each of the one or more text predictions having a probability value;
    estimate, using a vector space technique, a likelihood that each of the one or more text predictions belongs in the text input; and
    generate a modified probability value for each of the one or more text predictions based on the estimated likelihood that the text prediction belongs in the text input.

2. The system according to claim 1, further comprising a vector map comprising a context vector for each term of a plurality of terms in a set of documents, wherein the context vector comprises a sum of index vectors for all documents of the set of documents in which a term occurs.

3. The system according to claim 2, wherein the vector map is a Random Indexing Term-Vector Map.

4. The system according to claim 3, wherein the processor is configured to generate a set of Prediction Vectors, comprising a context vector retrieved from the vector map for each text prediction that has an equivalent in the vector map.

5. The system according to claim 4, wherein if the text prediction is a phrase, the processor is configured to generate a Prediction Vector comprising an average of the context vectors corresponding to each term within the phrase.

6. The system according to claim 4, wherein the text input comprises two or more terms and wherein the processor is configured to retrieve, from the vector map, a context vector for each of the two or more terms in the text input that has an equivalent in the vector map and to generate an Average Document Vector by determining the average of the context vectors retrieved.

7. The system according to claim 4, wherein the processor is configured to determine similarity between the Average Document Vector and each of the Prediction Vectors, to generate a similarity value associated with each text prediction.

8. The system according to claim 7, wherein the processor is configured to modify the probability values associated with each text prediction that has an equivalent in the vector map on the basis of the similarity values.

9. The system according to claim 2, wherein the processor is configured to update the vector map by assigning a new index vector to a completed text sequence input and by adding the new index vector to the sum of index vectors for each term contained in the completed text sequence input.

10. A method of generating text input for a computing device from user input, comprising:
  receiving a text input;
  generating one or more text predictions based upon the text input;
  estimating, by a processor using a vector space technique, a likelihood that each of the one or more text predictions belongs in the text input; and
  determining a modified probability value for each of the one or more text predictions based upon the estimated likelihood that the text prediction belongs in the text input; and
  outputting the p most probable text predictions.

11. The method according to claim 10, wherein generating a modified probability value for each of the text predictions comprises generating a vector map which comprises a context vector for each term of a plurality of terms in a set of documents, wherein the context vector comprises a sum of index vectors for all documents of the set of documents in which a term occurs.

12. The method according to claim 11, wherein the step of generating a vector map further comprises filtering out from the vector map terms with a very high occurrence rate across the set of documents or stopwords.

13. The method according to claim 11, wherein the vector map is a Random Indexing Term-Vector Map, and generating a vector map comprises generating context vectors using Random Indexing.

14. The method according to claim 11, further comprising generating a set of Prediction Vectors, by retrieving from the vector map a context vector for each text prediction that has an equivalent in the vector map.

15. The method according to claim 14, wherein if the text prediction is a phrase, the generation of a Prediction Vector further comprises averaging the context vectors corresponding to each term within the phrase.

16. The method according to claim 14, wherein the text input comprises two or more terms and the method further comprises retrieving, from the vector map, a context vector for each term of the two or more terms which has an equivalent in the vector map and generating an Average Document Vector by calculating the average of the context vectors retrieved for each term in the text input.

17. The method according to claim 16, further comprising calculating the similarity between the Average Document Vector and each of the Prediction Vectors and providing a similarity value associated with each text prediction.

18. The method according to claim 17, further comprising modifying the probabilities associated with each text prediction that has an equivalent in the vector map on the basis of the similarity values.

19. The method according to claim 11, wherein once a user has entered a complete text sequence, the method further comprises adding the completed text sequence to the set of documents.

20. The method according to claim 19, further comprising updating the vector map by assigning a new index vector to the completed text sequence and by adding the new index vector to the sum of index vectors for each term contained in the completed text sequence.

* * * * *